United States Patent
Kitagawa

(12) 
(10) Patent No.: US 7,959,491 B2
(45) Date of Patent: Jun. 14, 2011

(54) METHOD FOR SLICING WORKPIECE BY USING WIRE SAW AND WIRE SAW

(75) Inventor: Koji Kitagawa, Nishishirakawa (JP)

(73) Assignee: Shin-Etsu Handotai Co., Ltd., Tokyo (JP)

( * ) Notice: Subject to any disclaimer, the term of this patent is extended or adjusted under 35 U.S.C. 154(b) by 0 days.

(21) Appl. No.: 12/734,452

(22) PCT Filed: Dec. 1, 2008

(86) PCT No.: PCT/JP2008/003540
§ 371 (c)(1),
(2), (4) Date: May 3, 2010

(87) PCT Pub. No.: WO2009/078130
PCT Pub. Date: Jun. 25, 2009

(65) Prior Publication Data
US 2010/0258103 A1 Oct. 14, 2010

(30) Foreign Application Priority Data

Dec. 19, 2007 (JP) ................................ 2007-327890

(51) Int. Cl.
*B24B 49/00* (2006.01)
(52) U.S. Cl. ............................ 451/7; 451/53; 125/16.01
(58) Field of Classification Search ............... 451/7, 53; 125/16.01, 16.02, 21
See application file for complete search history.

(56) References Cited

U.S. PATENT DOCUMENTS

| | | | | |
|---|---|---|---|---|
| 6,113,473 A | * | 9/2000 | Costantini et al. | 451/60 |
| 6,315,635 B1 | * | 11/2001 | Lin | 451/7 |
| 6,652,356 B1 | * | 11/2003 | Ariga | 451/7 |
| 2002/0174861 A1 | * | 11/2002 | Lundt et al. | 125/21 |
| 2006/0249134 A1 | * | 11/2006 | Kawasaki et al. | 125/21 |
| 2007/0178807 A1 | * | 8/2007 | Gupta et al. | 451/5 |
| 2010/0089377 A1 | * | 4/2010 | Oishi et al. | 125/16.02 |

FOREIGN PATENT DOCUMENTS

| | | |
|---|---|---|
| JP | A-5-185419 | 7/1993 |
| JP | A-11-58365 | 3/1999 |
| JP | A-11-245153 | 9/1999 |
| JP | A-2003-1624 | 1/2003 |
| JP | A-2003-145406 | 5/2003 |
| JP | A-2005-103683 | 4/2005 |
| JP | A-2006-150505 | 6/2006 |
| WO | WO00/43162 | 7/2000 |

OTHER PUBLICATIONS

Dec. 22, 2008 Search Report issued in International Patent Application No. PCT/JP2008/003540 (with translation).

* cited by examiner

*Primary Examiner* — Maurina Rachuba
(74) *Attorney, Agent, or Firm* — Oliff & Berridge, PLC

(57) ABSTRACT

The present invention is a wire saw in which a wire is wound around a plurality of grooved rollers, the workpiece is sliced into wafers by causing the wire to travel and pressing the workpiece against the wire while a slurry is supplied to the grooved rollers, the wire saw controlling in such a manner that the workpiece is sliced while a supply temperature of the slurry is increased from the start to the end of slicing the workpiece. As a result, there is provided a wire saw in which Warp of the workpiece to be sliced can be improved by suppressing a decrease in a temperature of the workpiece in the vicinity of the slicing end portion of the workpiece and by making an increase in displacement of the grooved roller during slicing straight, that is, by making the slicing trajectory depicted in the workpiece close to a straight line.

8 Claims, 12 Drawing Sheets

WORKPIECE

FIG. 5
(A)
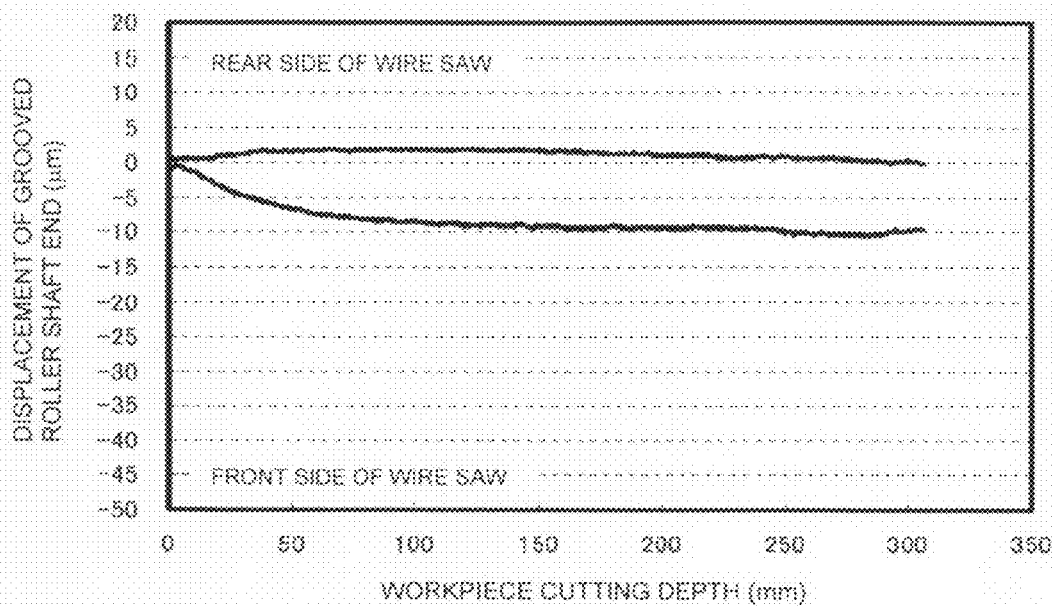
(B)
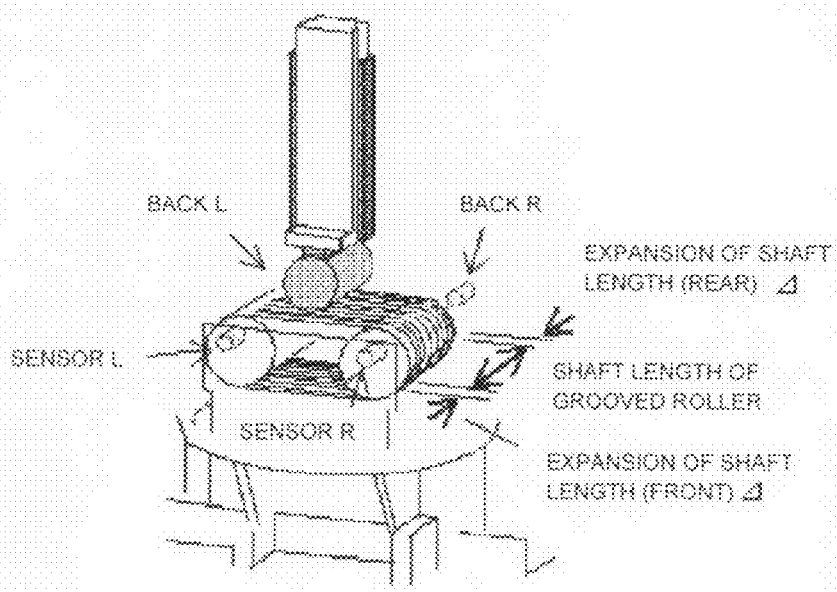

METHOD FOR SLICING WORKPIECE BY USING WIRE SAW AND WIRE SAW

TECHNICAL FIELD

The present invention relates to a method for slicing a workpiece (e.g., a silicon ingot or an ingot of a compound semiconductor) into many wafers by using a wire saw.

BACKGROUND ART

In recent years, an increase in size of a wafer is demanded, and a wire saw is mainly used to slice a workpiece with this increase in size.

The wire saw is an apparatus that causes a wire (a high-tensile steel wire) to travel at a high speed, presses a workpiece against the wire to cut the workpiece while a slurry is applied to the wire and thereby slices the workpiece into many wafers at the same time.

Here, an outline of an example of a conventionally general wire saw is shown in FIG. 3.

As shown in FIG. 3, a wire saw 101 mainly includes a wire 102 for slicing a workpiece, grooved rollers 103 around which the wire 102 is wound, a mechanism 104 for giving the wire 102 a tensile force, a mechanism 105 for feeding the workpiece to be sliced downward, and a mechanism 106 for supplying a slurry at the time of slicing.

The wire 102 is unreeled from one wire reel 107 and reaches the grooved rollers 103 via the tensile-force-giving mechanism 104 composed of a powder clutch (a constant torque motor 109), a dancer roller (a dead weight) (not shown) and the like through a traverser 108. The wire 102 is wound around this grooved rollers 103 for approximately 300 to 400 turns to form a wire row, and then taken up by a wire reel 107' via the other tensile-force-giving mechanism 104'.

Moreover, each of the grooved rollers 103 is a roller that has a steel cylinder of which a polyurethane resin is pressed in the periphery and that has grooves formed at a fixed pitch on a surface thereof. The wound wire 102 can be driven in a reciprocating direction for a predetermined traveling distance by a driving motor 110.

It is to be noted that the workpiece-feeding mechanism 105 feeds the workpiece toward the wire 102 wound around the grooved rollers 103 by holding and pushing down the workpiece at the time of slicing the workpiece.

Moreover, nozzles 115 are provided near the grooved rollers 103 and the wound wire 102, and the slurry can be supplied to the wire 102 from a slurry tank 116 at the time of slicing. Additionally, a slurry chiller 117 is connected with the slurry tank 116 so that a temperature of the slurry to be supplied can be adjusted.

With the wire saw 101, an appropriate tensile force is applied to the wire 102 with a wire-tensile-force-giving mechanism 104, the wire 102 is caused to travel in a reciprocating direction with the driving motor 110 and free-abrasive grains in the supplied slurry are pushed into an inner portion of a wire groove (a slicing groove of the workpiece) by the wire 102 to scrape a bottom portion of the groove of the workpiece so that the workpiece is sliced.

Friction that occurs in this case causes generation of heat at a slicing portion of the workpiece and thereby the workpiece is thermally expanded during slicing. Moreover, the grooved roller is axially expanded by thermal expansion under frictional heat between the wire and the grooved roller and under frictional heat generated at a bearing portion, which sustains the grooved roller. Consequently, there are instances that a relative position between the workpiece and the wire row, which is spirally wound around the grooved rollers, changes during slicing.

It has been known that displacement of the grooved roller in an axial direction has a constant correlation with a temperature of the slurry supplied during slicing the workpiece (See Japanese Patent Laid-open (Kokai) No. H5-185419).

A change in the relative position between the workpiece and the wire row, which is caused by the thermal expansion of the workpiece and the expansion of the grooved roller in an axial direction, brings about inflecting slicing trajectory that is depicted in the workpiece by the wire 102. There is a problem that this inflection of the slicing trajectory is detected as Warp in a shape measurement after wafer processing.

For solving the problem regarding the generation of heat in the workpiece during slicing, there is disclosed a wire saw that has a workpiece cooling means provided in a workpiece holding member and slices the workpiece with cooling it (See Japanese Patent Laid-open (Kokai) No. H11-58365).

However, in a method for slicing the workpiece by using this wire saw, it is difficult to have a sufficient cooling capability since a slicing portion is far from a cooling portion and a size of the cooling portion is restricted, even if the workpiece is cooled with the workpiece cooling means provided in the workpiece holding member during slicing. Additionally, this method cannot control the thermal expansion of the grooved roller.

On the other hand, regarding the thermal expansion of the grooved roller during slicing, there is disclosed a wire saw that has bearings for rotatably sustaining a plurality of the grooved rollers, a cooling-medium-supplying means for supplying a cooling medium that cools each of the bearings and a cooling-medium-temperature-adjusting means for adjusting a temperature of the cooling medium (See Japanese Patent Laid-open (Kokai) No. 2003-145406).

Although this wire saw can adjust the temperature of the cooling medium to be supplied to an inner race side of the bearings, which sustain the grooved rollers, it is difficult for the wire saw to cool an outer race side of the bearings. Since the thermal expansion of the grooved roller is also affected strongly by a temperature of the slurry supplied to a peripheral surface of the grooved roller, it is difficult to effectively reduce the thermal expansion of the grooved roller by the method of adjusting only the temperature of the cooling medium supplied to a shaft part of the grooved roller. Additionally, this wire saw cannot control the thermal expansion of the workpiece during slicing.

Moreover, there is disclosed a method for slicing the workpiece while a change in temperature of the workpiece is made small, for example, by supplying the slurry having a constant temperature during slicing the workpiece or the slurry having a predetermined temperature by controlling the temperature in Japanese Patent Laid-open (Kokai) No. 2003-1624.

Moreover, there is disclosed a wire saw that has a means for pouring the slurry of which a temperature is controlled on the workpiece directly or a means for jetting a medium of which a temperature is controlled on the workpiece directly to control the temperature of the workpiece in International Publication Pamphlet WO00/43162.

However, any of the foregoing conventional arts have such problems that a special mechanism needs to be added to the wire saw or an improvement effect on the Warp is insufficient.

DISCLOSURE OF INVENTION

Hence, the present inventor conducted experiments, measured the temperature of the workpiece and an amount of
"

displacement of the grooved roller in a front and a rear side of the wire saw during slicing, and investigated a reason for an occurrence of the Warp generated in the case of slicing the workpiece by using a wire saw.

A silicon ingot having a diameter of 300 mm and a length of 300 mm, which was prepared for the experiments, was sliced by using the wire saw shown in FIG. 3 while a supply temperature of the slurry is controlled to be a constant temperature of 23° C. during slicing.

A result of measuring a change in the temperature of the workpiece during slicing is shown in FIG. 4.

It is to be noted that the temperature of the workpiece was measured at both ends of the workpiece by using a thermocouple.

As shown in FIG. 4, during slicing the workpiece, the temperature of the workpiece rose from the start of slicing, reached 38° C. (increase of approximately 15° C.) when a cutting depth of the workpiece was approximately 170 mm, and then fell. In the vicinity of a slicing end portion (in this case, the cutting depth was approximately 275 to 300 mm), the temperature of the workpiece precipitously fell and became 23° C., which was nearly the same as the supply temperature of the slurry at the end of slicing.

It was thought that a shape of the Warp due to the change in the temperature of the workpiece was concave with respect to a face of both ends of the workpiece and the Warp of approximately 5 μm was generated at both ends of the workpiece in consideration for a thermal expansion coefficient of a silicon, a method for fixing the workpiece in this experiments and a positional relationship between the grooved roller and the workpiece in the wire saw that was used in this experiments.

Next, A result of measuring an amount of the displacement of the grooved roller is shown in FIG. 5(A).

It is to be noted that the amount of the displacement of the grooved roller was measured by arranging an eddy current sensor in an axial direction of the grooved roller in close proximity to the grooved roller (See FIG. 5(B)).

As shown in FIG. 5(A), a position of the grooved roller in the front side of an apparatus was displaced by approximately 10 μm forward between the start of slicing and a cutting depth of 150 mm of the workpiece. Then, the amount of the displacement was constant until the end of slicing the workpiece. On the other hand, a position of the grooved roller in the rear side of the apparatus hardly changed.

It was thought that a shape of the Warp due to the displacement of the grooved roller was convex with respect to a face of the workpiece in the front side of the apparatus, the Warp of approximately 3 μm was generated on an end face of the workpiece in the front side of the apparatus and the Warp of approximately 0.7 μm was generated on an end face of the workpiece in the rear side of the apparatus in consideration for a thermal expansion coefficient of a silicon, a method for fixing the workpiece in this experiments and a positional relationship between the grooved roller and the workpiece in the wire saw that was used in this experiments.

As described above, the Warp measured actually in a wafer measurement is caused by a combination the foregoing inflection of the slicing trajectory due to the change in the temperature of the workpiece and the displacement of the grooved roller with the inflection of the slicing trajectory due to various other factors that cannot be quantified. Accordingly, it is important to reduce factors that can be quantified, that is, the inflection of the slicing trajectory due to the change in the temperature of the workpiece and the displacement of the grooved roller in order to improve the Warp.

In view of the above-explained problems, it is an object of the present invention to provide a wire saw and a method for slicing a workpiece by using a wire saw in which the slicing trajectory depicted in the workpiece can be made close to a straight line by suppressing a decrease in the temperature of the workpiece in the vicinity of the slicing end portion of the workpiece and by reducing an amount of a change in a rate of increase in the displacement of the grooved roller during slicing so that the Warp of the workpiece to be sliced can be improved.

To achieve this object, the present invention provides a method for slicing a workpiece by using a wire saw including winding a wire around a plurality of grooved rollers, slicing the workpiece into wafers by causing the wire to travel and pressing the workpiece against the wire while supplying a slurry to the grooved rollers, wherein the workpiece is sliced while a supply temperature of the slurry is increased from the start to the end of slicing the workpiece.

In this manner, when the workpiece is sliced while the supply temperature of the slurry is increased from the start to the end of slicing the workpiece, the decrease in the temperature of the workpiece can be suppressed in the vicinity of the slicing end portion of the workpiece and the amount of the change in the rate of increase in the displacement of the grooved roller can be reduced during slicing. Consequently, the slicing trajectory depicted in the workpiece can be made close to a straight line and forming the Warp of the workpiece to be sliced can be suppressed.

In this case, it is preferable that the increase in the supply temperature of the slurry from the start to the end of slicing the workpiece is not less than 5° C. and not more than 15° C.

When the increase in the supply temperature of the slurry is not less than 5° C., the decrease in the temperature of the workpiece can be surely suppressed in the vicinity of the slicing end portion. When the increase in the supply temperature of the slurry is not more than 15° C., a negative influence on the Warp does not occur which is caused by an occurrence of reduction in accuracy of holding and feeding the workpiece of the wire saw due to an increase in a temperature of a mechanism portion of the wire saw except the workpiece.

In this case, it is preferable that a difference between the supply temperature of the slurry at the start of slicing the workpiece and a temperature of the workpiece at the start of slicing the workpiece is 3° C. or less.

In this manner, when the difference between the supply temperature of the slurry at the start of slicing the workpiece and the temperature of the workpiece at the start of slicing the workpiece is 3° C. or less, the increase in the temperature of the workpiece can be smoothed at the start of slicing the workpiece and the Warp can be prevented from degrading due to a precipitous change in the temperature of the workpiece at the start of slicing the workpiece.

In this case, it is preferable that a rate of increase in the supply temperature of the slurry from the start to the end of slicing the workpiece is constant.

In this manner, when the rate of increase in the supply temperature of the slurry from the start to the end of slicing the workpiece is constant, the rate of increase in the displacement of the grooved roller can be constant during slicing. Consequently, the slicing trajectory depicted in the workpiece can be made closer to a straight line and forming the Warp of the workpiece to be sliced can be more effectively suppressed.

Furthermore, the present invention provides a wire saw in which a wire is wound around a plurality of grooved rollers, the workpiece is sliced into wafers by causing the wire to travel and pressing the workpiece against the wire while a slurry is supplied to the grooved rollers, the wire saw controlling in such a manner that the workpiece is sliced while a supply temperature of the slurry is increased from the start to the end of slicing the workpiece.

In this manner the wire saw according to the present invention controls in such a manner that the workpiece is sliced while the supply temperature of the slurry is increased from the start to the end of slicing the workpiece, thereby can suppress the decrease in the temperature of the workpiece in the vicinity of the slicing end portion of the workpiece, and can reduce the amount of the change in the rate of increase in the displacement of the grooved roller during slicing. Consequently, the wire saw can make the slicing trajectory depicted in the workpiece close to a straight line and can suppress forming the Warp of the workpiece to be sliced.

In this case, the wire saw preferably controls the increase in the supply temperature of the slurry from the start to the end of slicing the workpiece to be not less than 5° C. and not more than 15° C.

When the increase in the supply temperature of the slurry is controlled to be not less than 5° C., the decrease in the temperature of the workpiece can be surely suppressed in the vicinity of the slicing end portion. When the increase in the supply temperature of the slurry is controlled to be not more than 15° C., a negative influence on the Warp does not occur which is caused by an occurrence of reduction in accuracy of holding and feeding the workpiece of the wire saw due to an increase in a temperature of a mechanism portion of the wire saw except the workpiece.

In this manner, the wire saw according to the present invention controls the increase in the supply temperature of the slurry from the start to the end of slicing the workpiece to be not less than 5° C. and not more than 15° C., and thereby can effectively reduce the Warp of the workpiece to be sliced.

In this case, the wire saw preferably controls a difference between the supply temperature of the slurry at the start of slicing the workpiece and a temperature of the workpiece at the start of slicing the workpiece to be 3° C. or less.

In this manner, the wire saw according to the present invention controls the difference between the supply temperature of the slurry at the start of slicing the workpiece and a temperature of the workpiece at the start of slicing the workpiece to be 3° C. or less, thereby can smooth the increase in the temperature of the workpiece at the start of slicing the workpiece and can prevent the Warp from degrading due to a precipitous change in the temperature of the workpiece at the start of slicing the workpiece.

In this case, the wire saw preferably controls a rate of increase in the supply temperature of the slurry from the start to the end of slicing the workpiece to be constant.

In this manner, the wire saw according to the present invention controls the rate of increase in the supply temperature of the slurry from the start to the end of slicing the workpiece to be constant, thereby the rate of increase in the displacement of the grooved roller can be constant during slicing. Consequently, the wire saw can make the slicing trajectory depicted in the workpiece closer to a straight line and can more effectively suppress forming the Warp of the workpiece to be sliced.

Since the wire saw according to the present invention controls in such a manner that the workpiece is sliced while the supply temperature of the slurry is increased from the start to the end of slicing the workpiece, the decrease in the temperature of the workpiece can be suppressed in the vicinity of the slicing end portion of the workpiece and the amount of the change in the rate of increase in the displacement of the grooved roller can be reduced during slicing. There is thereby provided the method for slicing a workpiece that enables making the slicing trajectory depicted in the workpiece close to a straight line and suppressing the forming of the Warp of the workpiece to be sliced without adding a special mechanism to the wire saw.

BRIEF DESCRIPTION OF THE DRAWINGS

FIG. 5 are an experiment result of the amount of the displacement of the grooved roller when the workpiece is sliced by using a conventional wire saw, wherein 5(A) is a graph showing the amount of the displacement of the grooved roller during slicing and 5(B) is an explanatory view showing a measurement method of the amount of the displacement of the grooved roller.

BEST MODE FOR CARRYING OUT THE INVENTION

Hereinafter, an embodiment according to the present invention will be explained, but the present invention is not restricted thereto.

As mentioned above, the Warp measured actually in a wafer measurement is caused by the combination the foregoing inflection of the slicing trajectory due to the change in the temperature of the workpiece and the displacement of the grooved roller with the inflection of the slicing trajectory due to various other factors that cannot be quantified. Accordingly, it is important to reduce the factors that can be quantified, that is, the inflection of the slicing trajectory due to the change in the temperature of the workpiece and the displacement of the grooved roller in order to improve the Warp.

In order to solve the aforementioned problems, the present inventor repeatedly keenly conducted studies of a generation mechanism of the Warp in the wire saw and problems of a conventional method for improving the Warp. As a result, the present inventor found that although the conventionally proposed method for improving the Warp attempts to solve the problems by reducing absolute value of the increase in the temperature of the workpiece and the displacement due to the thermal expansion of the grooved roller, the absolute value of the temperature of the workpiece and the displacement due to the thermal expansion of the grooved roller does not necessarily determine a Warp value with regard to generation of the Warp in the wire saw and accordingly brought the present invention to completion.

That is, since the wire saw and the method for slicing a workpiece by using a wire saw according to the present invention controls in such a manner that the workpiece is sliced while the supply temperature of the slurry is increased from the start to the end of slicing the workpiece, the decrease in the temperature of the workpiece can be suppressed in the vicinity of the slicing end portion of the workpiece and the amount of the change in the rate of increase in the displacement of the grooved roller can be reduced during slicing. Consequently, the slicing trajectory depicted in the workpiece can be made close to a straight line and forming the Warp of the workpiece to be sliced can be suppressed.

Figure 1:
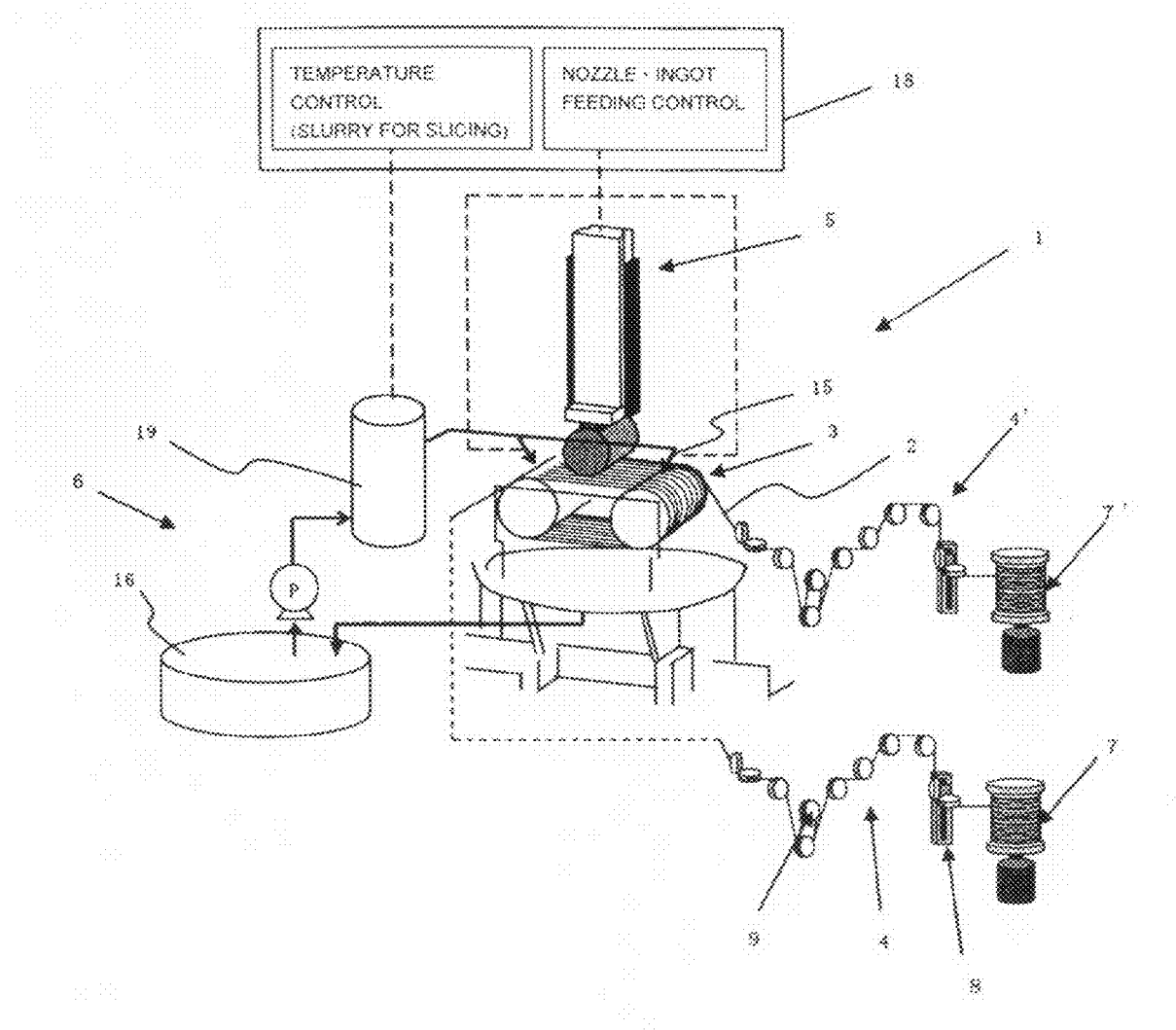
FIG. 1 is a schematic view showing an example of the wire saw according to the present invention.

FIG. 1 is a schematic view showing an example of the wire saw according to the present invention.

As shown in FIG. 1, the wire saw 1 mainly includes the wire 2 for slicing the workpiece, the grooved rollers 3, a wire-tensile-force-giving mechanism 4, an ingot-feeding mechanism 5, a slurry-supplying mechanism 6.

Here, the slurry-supplying mechanism 6 will be first explained. The slurry-supplying mechanism 6 is provided with nozzles 15 that supply the slurry for slicing to the grooved rollers 3 (the wire 2). The supply temperature of the slurry for slicing supplied through the nozzles 15 can be controlled.

Specifically, for example as shown in FIG. 1, the slurry-supplying mechanism 6 is composed such that a slurry tank 16 is connected with the nozzles 15 through a heat exchanger 19 controlled by a computer for controlling 18 to control the supply temperature of the slurry for slicing.

A type of the slurry is not restricted in particular, and the same type as a conventional slurry can be used. For example, the slurry that is composed of GC (silicon carbide) abrasive grains dispersed in a liquid can be used.

The nozzles 15 that supply the slurry for slicing and a workpiece-feeding mechanism 5 are connected with the computer for controlling 18. The slurry for slicing of which the temperature is controlled can be automatically jetted on the grooved rollers 3 (the wire 2) through the nozzles 15 in a predetermined amount at a predetermined timing with respect to a predetermined amount of feeding the workpiece, that is, a predetermined amount of slicing the workpiece by a preset program.

The computer for controlling 18 can control the amount of feeding the workpiece, the amount of jetting the slurry, the timing at which the slurry is jetted and the supply temperature of the slurry to be desired respectively. However a control means is not restricted thereto.

The wire 2 is unreeled from one wire reel 7 and reaches the grooved rollers 3 via the tensile-force-giving mechanism 4 composed of a powder clutch (a constant torque motor 9), a dancer roller (a dead weight) (not shown) and the like through a traverser 8. The wire 2 is wound around this grooved rollers 3 for approximately 300 to 400 turns to form the wire row. The wire 2 is taken up by a wire reel 7' via the other tensile-force-giving mechanism 4'.

Figure 2:
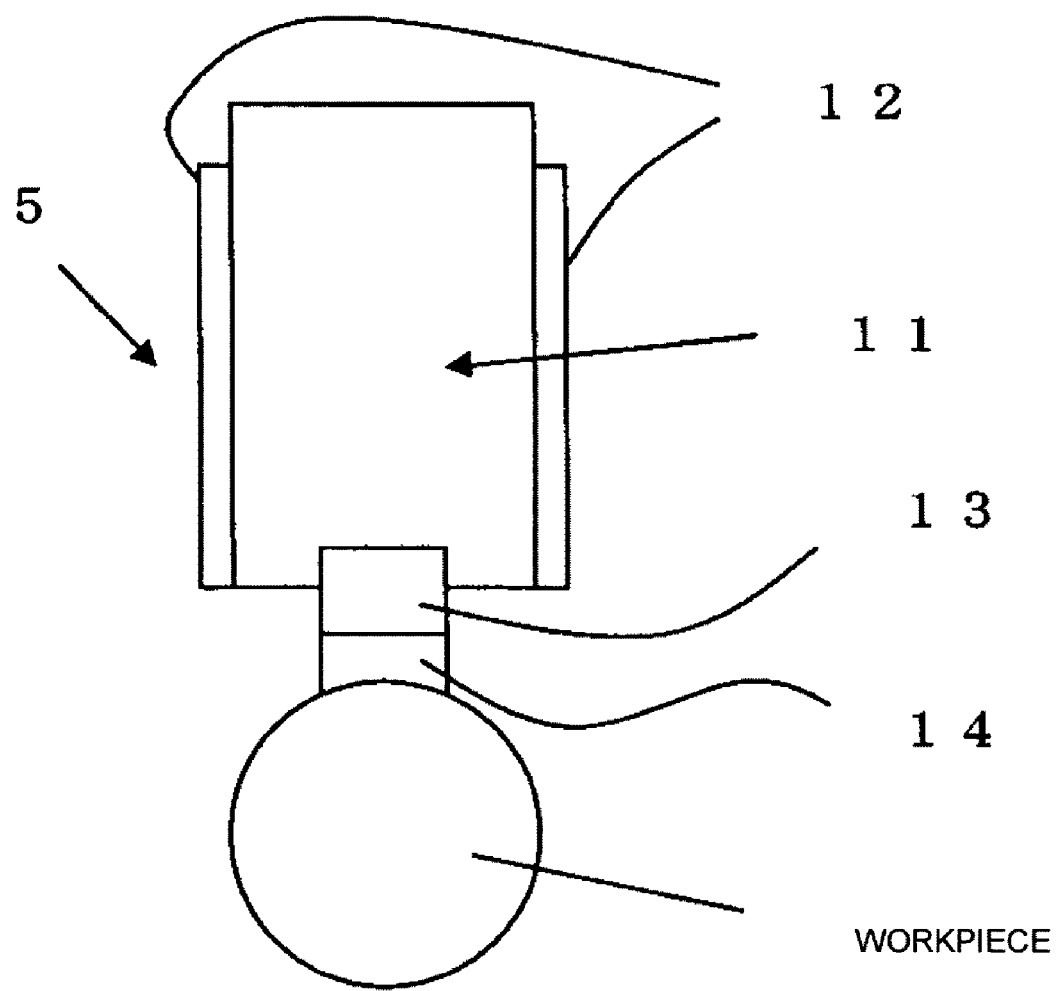
FIG. 2 is a schematic view showing an example of a workpiece-feeding mechanism that can be used in an apparatus according to the present invention.
Figure 3:
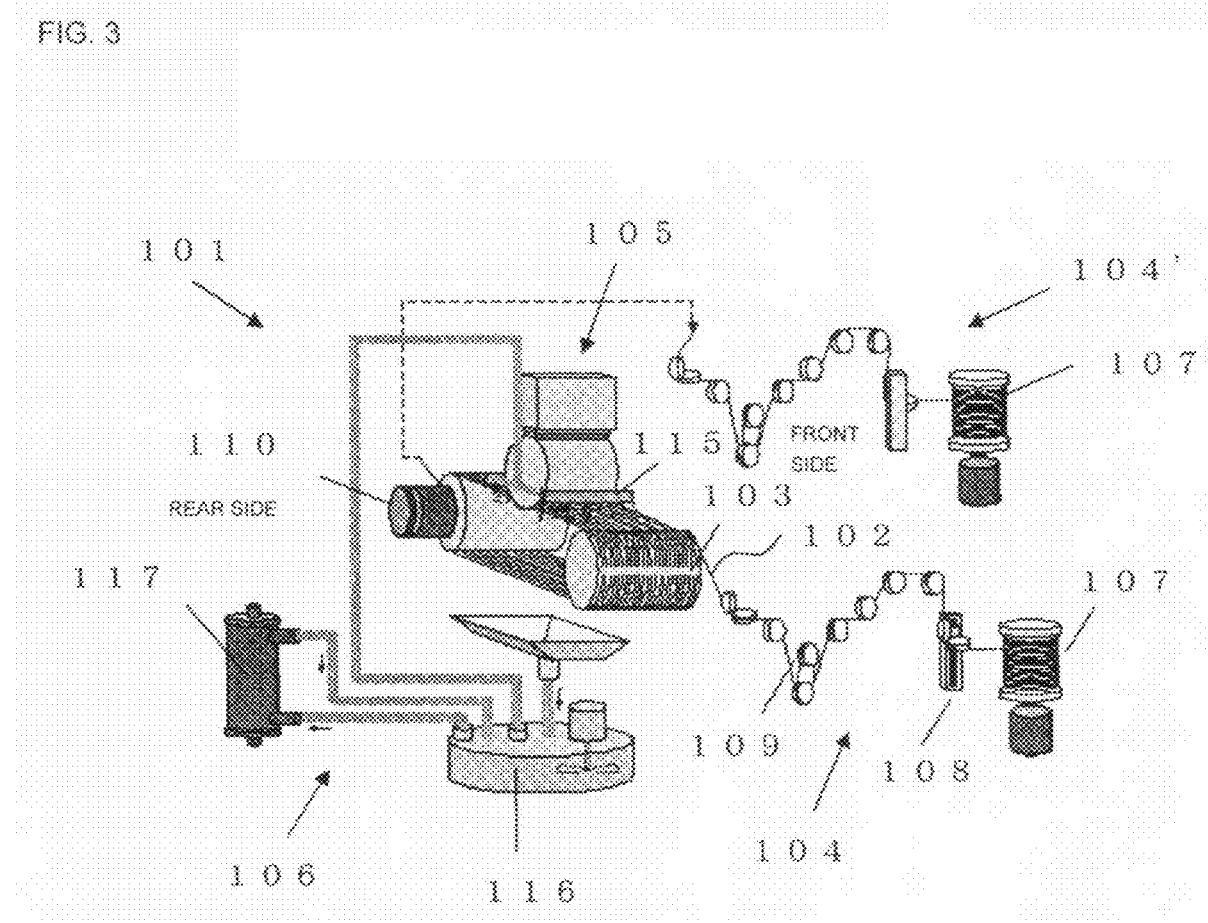
FIG. 3 is a schematic view showing an example of a conventional wire saw.

FIG. 2 shows an example of the workpiece-feeding mechanism 5 that can be used in the present invention. As shown in FIG. 2, the workpiece is adhered to a pad plate 14. The pad plate 14 is held by a workpiece plate 13. The workpiece is held by a workpiece-holding portion 11 of the workpiece-feeding mechanism 5 through the pad plate 14 and the workpiece plate 13.

This workpiece-feeding mechanism 5 includes the workpiece-holding portion 11 that is used to hold and push down the workpiece and an LM guide 12. Driving the workpiece-holding portion 11 along the LM guide 12 under control of a computer enables feeding the held workpiece at a previously programmed feed speed.

The workpiece held with the workpiece-holding portion 11 of the workpiece-feeding mechanism 5 as described above is fed to the wire 2 that is located below with the workpiece-feeding mechanism 5 at the time of slicing. The workpiece-feeding mechanism 5 feeds the workpiece downward until the wire reaches the pad plate 14 to finish slicing the workpiece. Then, the sliced workpiece is extracted from the wire row by reversing the direction of feeding the workpiece.

The wire 2, the grooved rollers 3, the wire-tensile-force-giving mechanism 4, and the ingot-feeding mechanism 5 except the slurry-supplying mechanism 6 and the computer for controlling 18, which controls the slurry-supplying mechanism 6, can be the same as those in a conventional wire saw.

A type and a thickness of the wire 2, a groove pitch of the grooved roller 3, structure in other mechanisms and the like are not restricted in particular, and can be determined each time so that desired slicing conditions can be obtained in accordance with a conventional method.

For example, the wire 2 can be formed of a special piano wire having a width of approximately 0.13 mm to 0.18 mm, and the grooved roller 3 having a groove pitch of (a desired wafer thickness+a slicing removal) can be adopted.

Figure 12:
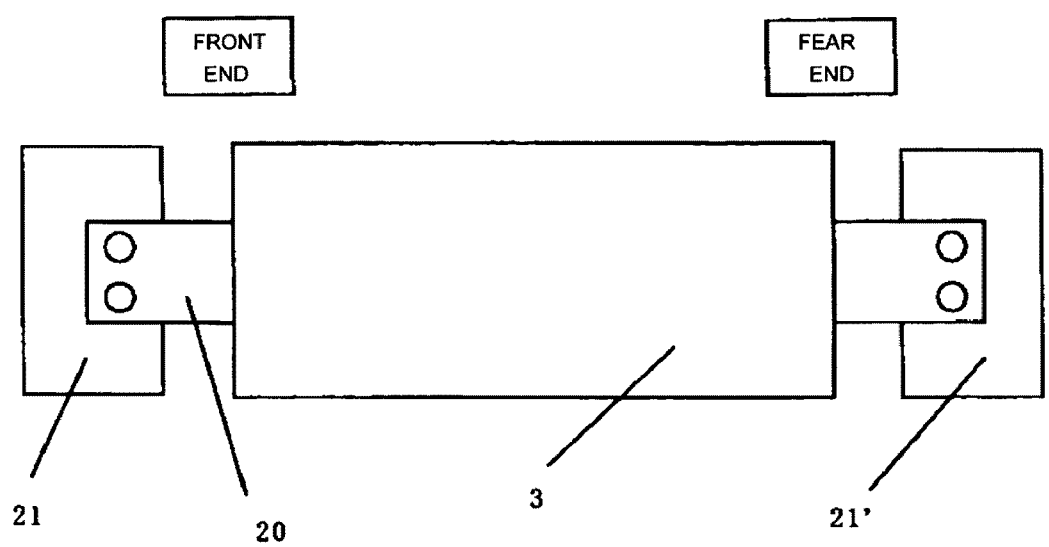
FIG. 12 is a schematic plan view showing an example of structure of the grooved roller.

Here, the grooved roller 3 will be additionally explained. An example of the grooved roller 3 that is conventionally used is shown in FIG. 12. Bearings 21, 21', which sustain a shaft 20 of the grooved roller, are placed at both ends of the grooved roller 3. For example, the bearing 21 is a radial-type in consideration for the foregoing change of the grooved roller 3 in an axial direction during slicing. The grooved roller 3 can axially expand toward a side of the radial-type bearing 21. On the other hand, the bearing 21' is a thrust-type and thus the grooved roller 3 is hard to expand toward a side of the thrust-type bearing 21'. The grooved roller 3 usually has such structure. When a length of the grooved roller 3 axially changes, since the grooved roller 3 is not fixed at both sides, one side can correspond with the change so that load is not excessively applied to the apparatus.

Thus, in the wire saw 1 according the present invention, when the expansion of the grooved roller 3 proceeds axially, the expansion mainly proceeds towards the side of the radial-type bearing 21 (referred to as a front of the wire saw).

It is to be noted that in the method for slicing according to the present invention, the grooved roller 3 of the wire saw 1 that is used is not restricted to the type as described above.

Figure 11:
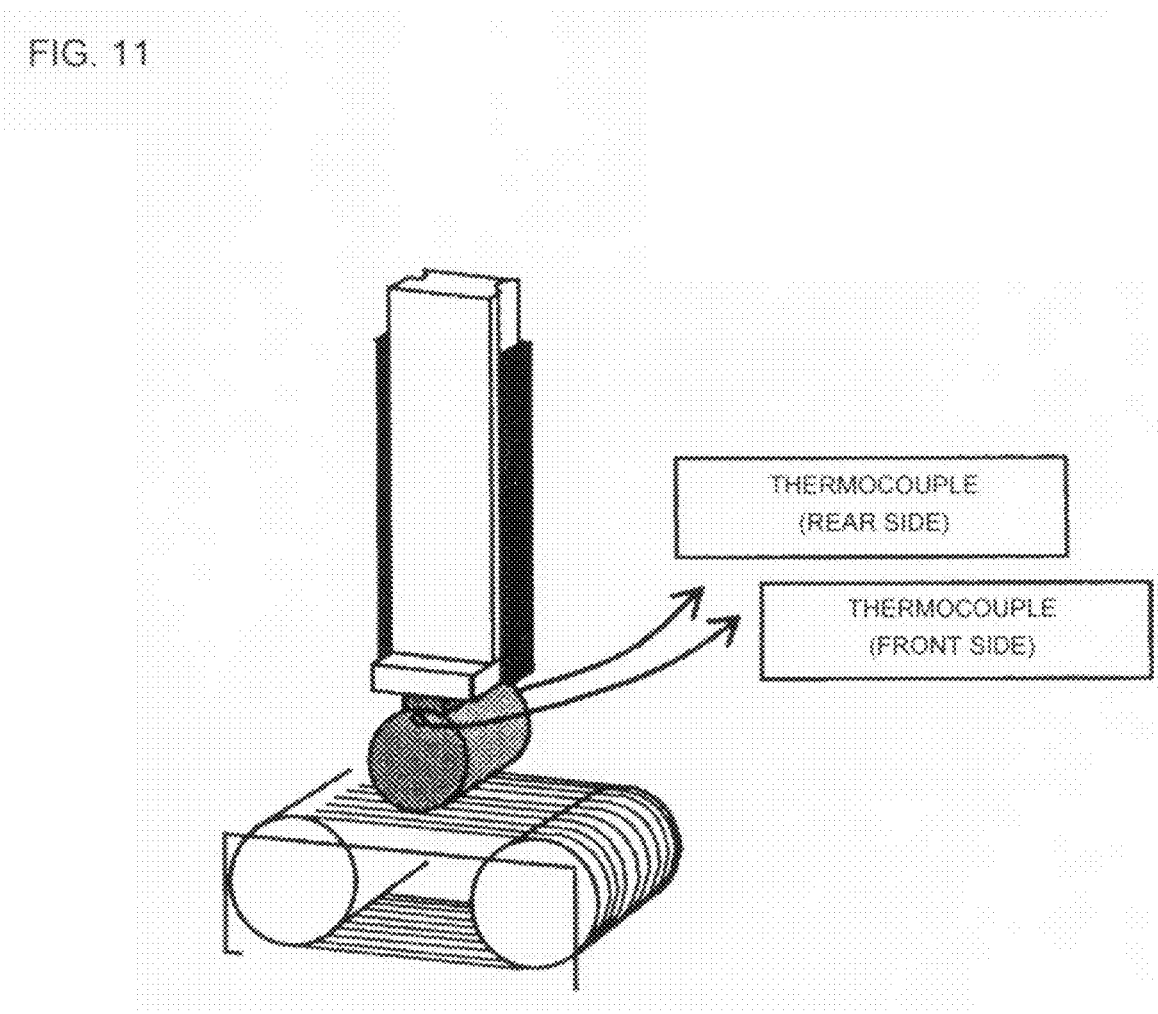
FIG. 11 is a schematic view showing a measurement method of the temperature of the workpiece.

Moreover, as shown in FIG. 11, a thermocouple is placed at both ends of the workpiece to measure the temperature of the workpiece. The thermocouple is connected with the computer for controlling 18 and data obtained by measurement can be processed with the computer for controlling 18.

The wire saw according to the present invention controls in such a manner that the workpiece is sliced while the supply temperature of the slurry is monotonically increased (the supply temperature is not decreased and the increase in the supply temperature is not stopped) from the start to the end of slicing the workpiece by controlling the workpiece-feeding mechanism 5 and the heat exchanger 19 with the computer for controlling 18. Furthermore, the wire saw preferably controls the increase in the supply temperature of the slurry from the start to the end of slicing the workpiece to be not less than 5° C. and not more than 15° C., and controls the difference between the supply temperature of the slurry at the start of slicing the workpiece and the temperature of the workpiece at the start of slicing the workpiece to be 3° C. or less.

In this case, the wire saw more preferably controls the rate of increase in the supply temperature of the slurry from the start to the end of slicing the workpiece to be constant. However, a control means is not restricted thereto.

Hereinafter, a procedure for carrying out the method for slicing according to the present invention using the wire saw 1 as described above will be explained.

First, the workpiece is held and fed downward at a predetermined speed with the workpiece-feeding means 5, the grooved rollers 3 are driven, and thereby the wire 2 to which a tensile force is given with the wire-tensile-force-giving means 4 is caused to travel in a reciprocating direction. It is to be noted that magnitude of the tensile force given to the wire 2, a traveling speed of the wire 2 and the like at this time can be appropriately set. For example, a tensile force of 2.5 to 3.0 kgf can be applied to the wire and the wire can be caused to travel in a reciprocating direction at an average speed of 400 to 600 m/min in a cycle of 1 to 2 c/min (30 to 60 s/c). These can be determined in accordance with, for example, the workpiece to be sliced.

Moreover, the jets of the slurry for slicing are started toward the grooved rollers 3 and the wire 2.

In this case, the heat exchanger 19 is controlled with the computer for controlling 18 in such a manner that the workpiece is sliced while the supply temperature of the slurry is monotonically increased from the start to the end of slicing the workpiece.

For the purpose of making the slicing trajectory depicted in the workpiece close to a straight line by suppressing the decrease in the temperature of the workpiece in the vicinity of the slicing end portion of the workpiece and by reducing the amount of the change in the rate of increase in the displacement of the grooved roller during slicing, the temperature of the slurry to be supplied is continuously increased from the start to the end of slicing the workpiece without decreasing the temperature of the slurry and without stopping the increase.

In this case, the heat exchanger 19 is more preferably controlled with the computer for controlling 18 in such a manner that the rate of increase in the supply temperature of the slurry from the start to the end of slicing the workpiece is constant.

In this manner, when the rate of increase in the supply temperature of the slurry from the start to the end of slicing the workpiece is controlled to be constant, the slicing trajectory depicted in the workpiece can be made closer to a straight line. However, a condition of the rate of increase in the supply temperature of the slurry is not restricted thereto in the wire saw according to the present invention. The rate of increase in the temperate of the slurry to be supplied can be changed from the start to the end of slicing the workpiece and is not necessarily constant at all times. However, it is preferable that an amount of a change in the rate of increase is as small as possible.

Moreover, the heat exchanger 19 is preferably controlled with the computer for controlling 18 in such a manner that the increase in the supply temperature of the slurry from the start to the end of slicing the workpiece is not less than 5° C. and not more than 15° C.

When the increase in the supply temperature of the slurry is not less than 5° C., the decrease in the temperature of the workpiece can be surely suppressed in the vicinity of the slicing end portion. When the increase in the supply temperature of the slurry is not more than 15° C., a negative influence on the Warp does not occur which is caused by reduction in accuracy of holding and feeding the workpiece of the wire saw due to an increase in a temperature of a mechanism portion of the wire saw except the workpiece.

Moreover, the heat exchanger 19 can be controlled with the computer for controlling 18 in such a manner that a difference between the supply temperature of the slurry at the start of slicing the workpiece and a temperature of the workpiece at the start of slicing the workpiece is 3° C. or less.

In this manner, when the difference between the supply temperature of the slurry at the start of slicing the workpiece and a temperature of the workpiece at the start of slicing the workpiece is 3° C. or less, the increase in the temperature of the workpiece can be smoothed at the start of slicing the workpiece and the Warp can be prevented from degrading due to a precipitous change in the temperature of the workpiece at the start of slicing the workpiece.

Hereinafter, the present invention will be explained in more detail based on examples, but the present invention is not restricted thereto.

Example 1

A silicon ingot having a diameter of 300 mm and an axial length of 300 mm was sliced into wafers by using the wire saw shown in FIG. 1 and the supply temperature of the slurry to be supplied to the grooved rollers was controlled at the time of slicing the workpiece.

The wire having a diameter of 160 µm was used, a tensile force of 2.5 kgf was applied to the wire, and the wire was caused to travel in a reciprocating direction at an average speed of 500 m/min in a cycle of 60 s/c to slice. The slurry obtained by mixing GC#1000 with a coolant at a weight ratio of 50:50 was used.

Moreover, as shown in FIG. 5(B), an eddy current sensor was arranged in an axial direction of the grooved roller 3 in close proximity to the grooved roller. This is because the displacement of the grooved roller in an axial direction can be measured, and thus is not essential for the present invention. Although the measurement of the displacement of the grooved roller 3 in an axial direction is not restricted to the foregoing means, use of the eddy current sensor enables the measurement with a high accuracy without contact and it is therefore preferable.

The temperature of the workpiece was set to be 23° C. at the start of slicing and the workpiece was sliced while the supply temperature of the slurry is increased (an increase of 12° C.) from 23° C. at the start of slicing to 35° C. at the end of slicing in such a manner that the rate of increase was constant.

Figure 6:
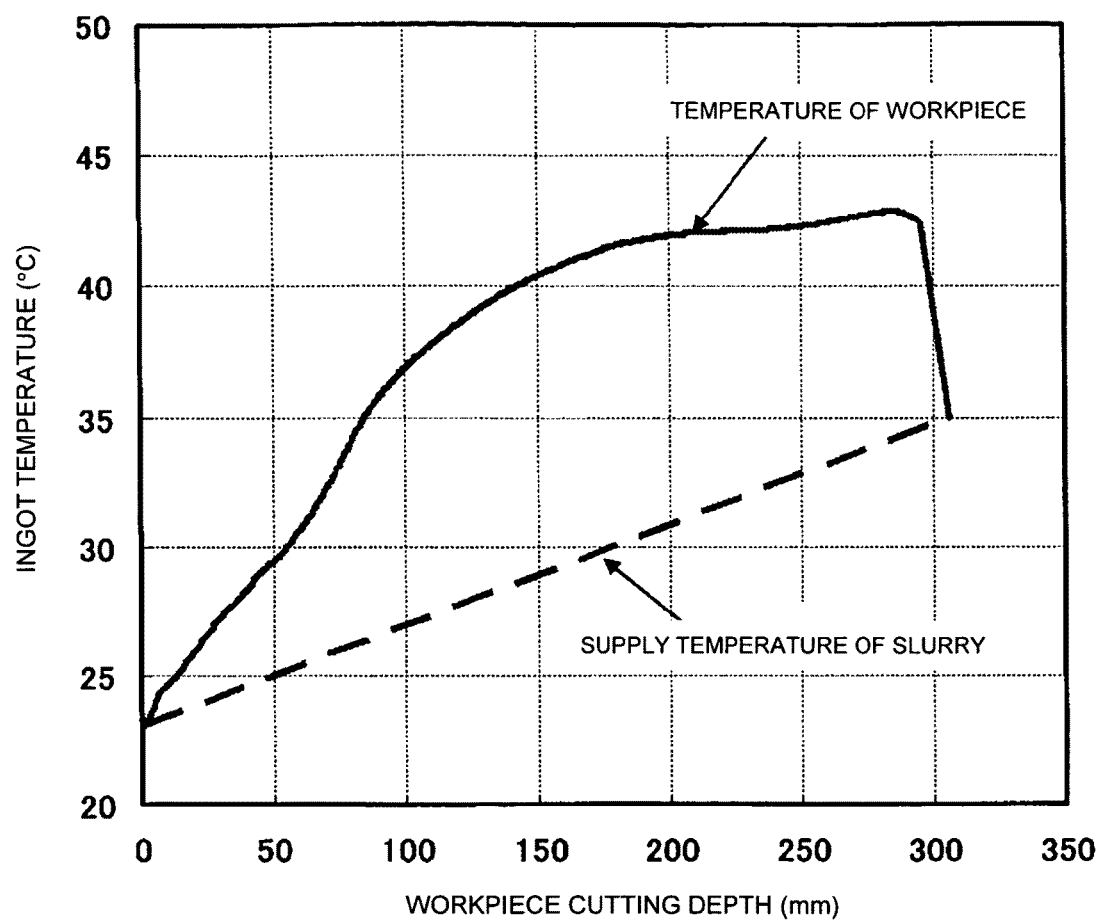
FIG. 6 is a graph showing the temperature of the workpiece and the supply temperature of the slurry during slicing the workpiece when the workpiece is sliced by using the wire saw according to the present invention.

A result of measuring the change in the temperature of the workpiece during slicing is shown in FIG. 6.

As shown in FIG. 6, the temperature of the workpiece kept rising from the start of slicing to a cutting depth of 285 mm to reach a maximum temperature of 42.9° C. Since the temperature of the slurry was a high temperature of 35° C. at the end of slicing, the decrease in the temperature of the workpiece was suppressed within 7.9° C. in the vicinity of a slicing end portion.

Figure 7:
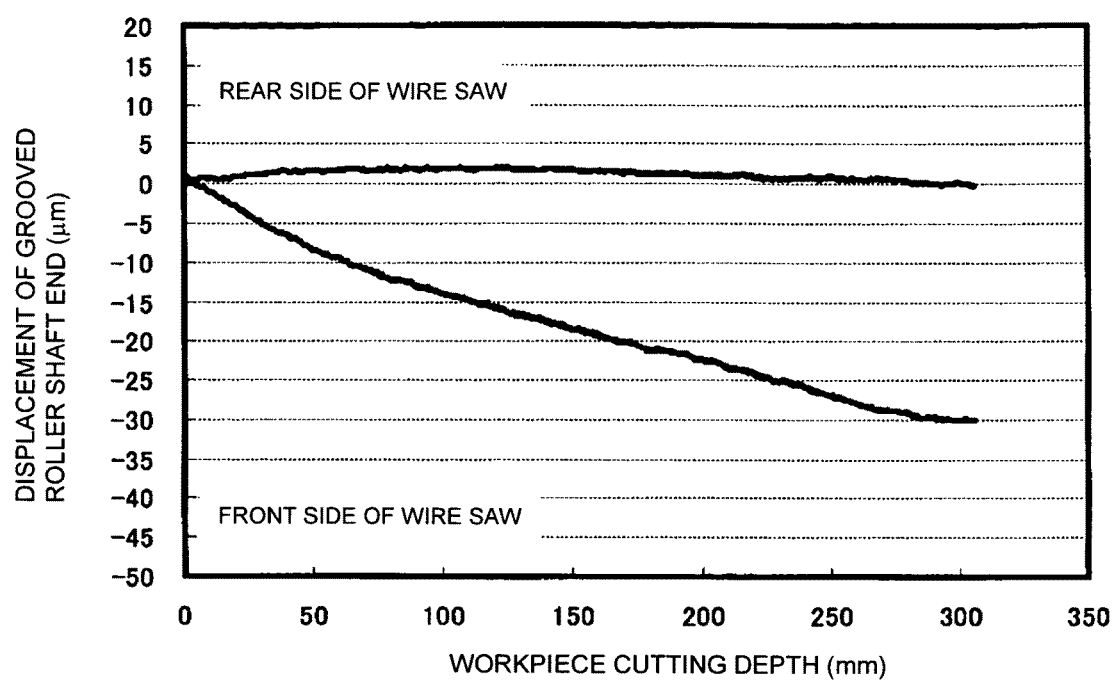
FIG. 7 is a graph showing the amount of the displacement of the grooved roller when the workpiece is sliced by using the wire saw according to the present invention.

On the other hand, as shown in FIG. 7, the front position of the grooved roller was displaced straight with respect to the cutting depth of the workpiece and the displacement reached 30 μm at the end of slicing. The displacement of the rear position was nearly constant regardless of the cutting depth of the workpiece. As described above, the amount of the displacement of the grooved roller increased to 30 μm from 10 μm, which was a result in the case of Comparative Example where a conventional wire saw was used and the supply temperature of the slurry was a constant temperature of 23° C. during slicing. However, since the amount of the displacement of the grooved roller increased straight with respect to the cutting depth of the workpiece, the workpiece slicing trajectory was not inflected as described below and influence on the forming of the Warp was greatly suppressed.

Figure 8:
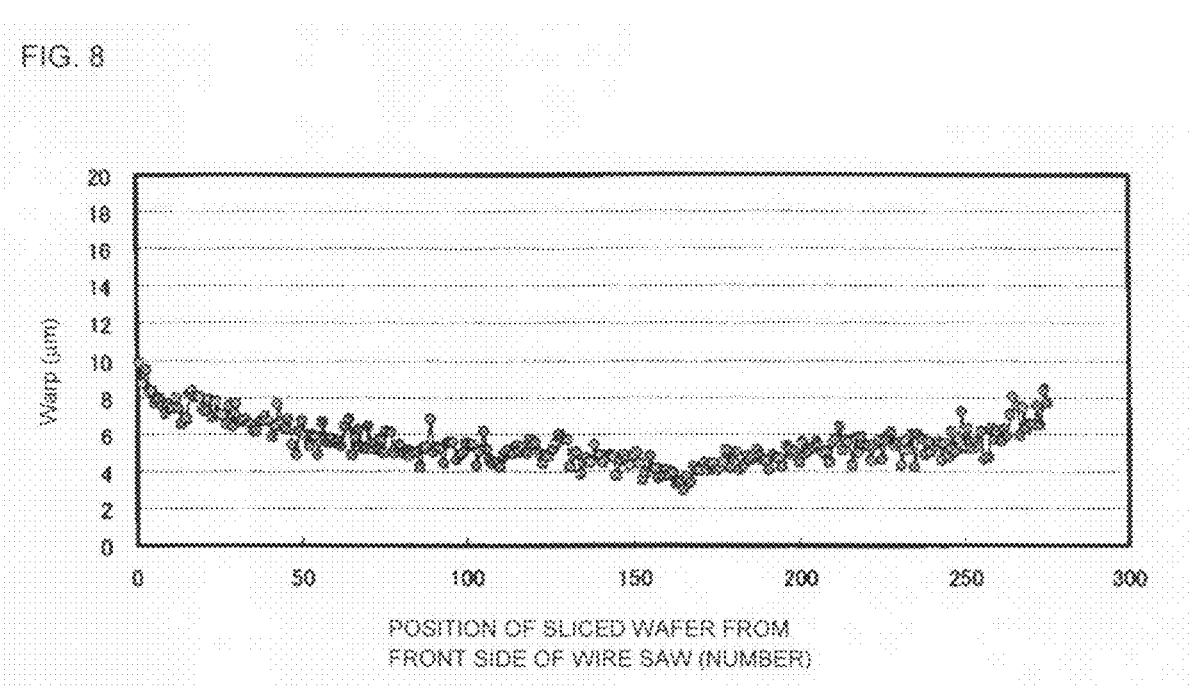
FIG. 8 is a graph showing distribution of the Warp of the wafer when the workpiece is sliced by using the wire saw according to the present invention.

FIG. 8 shows distribution of the Warp of the wafer that was measured after slicing. An average for all wafers was 5.51 μm and thus the Warp was greatly improved in comparison with the Warp of the wafer sliced by using a conventional wire saw.

Figure 10:
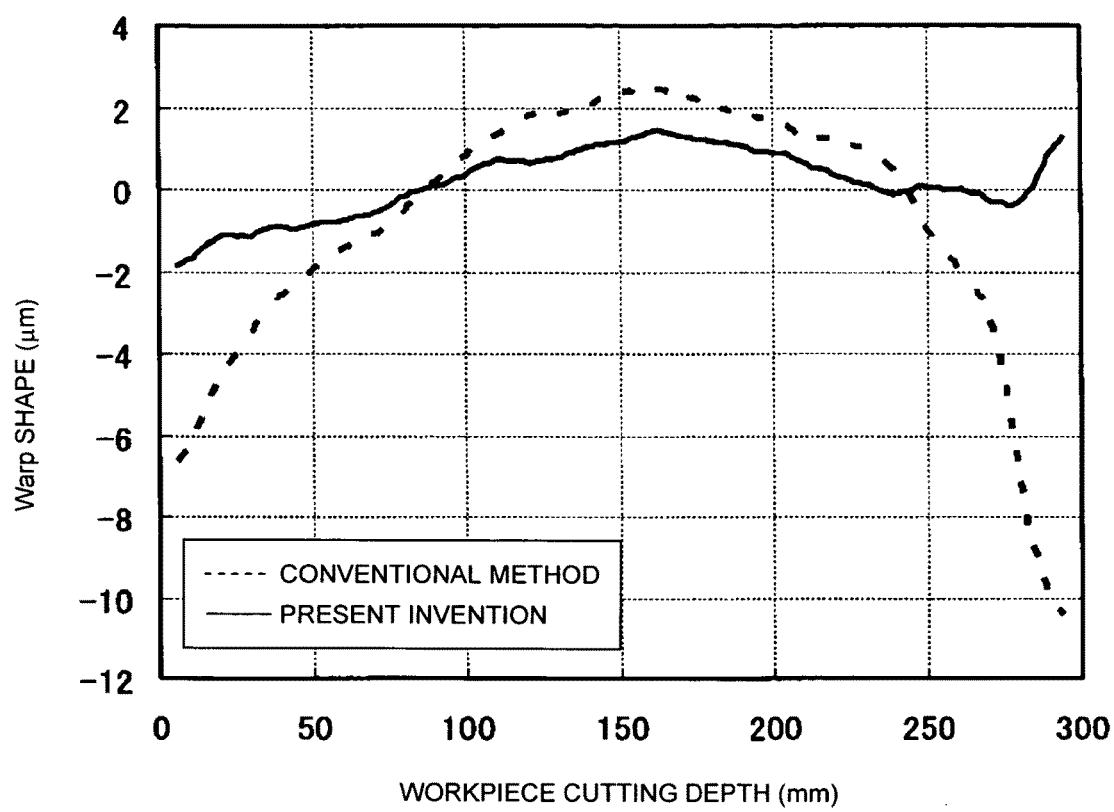
FIG. 10 is a graph showing a comparison of a shape of the Warp on a cross section in the direction of feeding the workpiece, the Warp being on the first wafer from a front side of the wire saw in the workpiece sliced respectively by using a conventional wire saw and the wire saw according to the present invention.

FIG. 10 shows a comparison of a shape of the Warp on a cross section in the direction of feeding the workpiece, the Warp being on the first wafer from the front side of the wire saw in the workpiece sliced respectively by using a conventional wire saw and the wire saw according to the present invention. FIG. 10 reveals that the inflection of a surface of the wafer sliced by using the wire saw according to the present invention was suppressed more than the case of using a conventional wire saw.

Example 2

The workpiece was sliced in the same conditions as Example 1 except of controlling in such a manner that the supply temperature of the slurry was increased at a constant rate of increase from 23° C. at the start of slicing to 28° C. at the middle of slicing (a cutting depth of 150 mm) and that it was increased at a constant rate of increase from that to 35° C. at the end of slicing (the rate of increase was controlled to be changed at the middle of slicing), and the same Warp evaluation as Example 1 was made.

As a result, an average for all wafers was 6.95 μm. Although it was worse than Example 1 since the rate of increase in the supply temperature of the slurry was changed halfway, the Warp was improved more than the Warp of the wafer sliced by using a conventional wire saw.

Example 3

The workpiece was sliced in the same conditions as Example 1 except of controlling in such a manner that the supply temperature of the slurry was increased at a constant rate of increase from 23° C. at the start of slicing to 30° C. at the middle of slicing (a cutting depth of 150 mm) and that it was increased at a constant rate of increase from that to 35° C. at the end of slicing (the rate of increase was controlled to be changed at the middle of slicing), and the same Warp evaluation as Example 1 was made.

As a result, an average for all wafers was 7.33 μm. Although it was worse than Example 1 since the rate of increase in the supply temperature of the slurry was changed halfway, the Warp was improved more than the Warp of the wafer sliced by using a conventional wire saw.

Example 4

The workpiece was sliced in the same conditions as Example 1 except of controlling in such a manner that the supply temperature of the slurry was increased at a constant rate of increase from 23° C. at the start of slicing to 28° C. at the end of slicing, and the same Warp evaluation as Example 1 was made.

As a result, an average for all wafers was 7.53 μm. Although it was worse than Example 1, the Warp was improved more than the Warp of the wafer sliced by using a conventional wire saw. Since the amount of the increase in the supply temperature of the slurry supplied during slicing was smaller than Example 1, an effect to make the slicing trajectory depicted in the workpiece closer to a straight line was small and thereby resulting in a smaller improvement than Example 1.

Example 5

The workpiece was sliced in the same conditions as Example 1 except of controlling in such a manner that the supply temperature of the slurry was increased at a constant rate of increase from 23° C. at the start of slicing to 40° C. at the end of slicing, and the same Warp evaluation as Example 1 was made.

As a result, an average for all wafers was 8.22 μm. Although it was worse than Example 1, the Warp was improved more than the Warp of the wafer sliced by using a conventional wire saw. It can be considered that since the amount of the increase in the supply temperature of the slurry supplied during slicing exceeded 15° C., the temperature of the mechanism portion of the wire saw except the workpiece increased, a negative influence on the Warp occurred due to an occurrence of reduction in accuracy of holding and feeding the workpiece of the wire saw, and thereby resulting in a smaller improvement than Example 1.

Example 6

The workpiece was sliced in the same conditions as Example 1 except of controlling in such a manner that the supply temperature of the slurry was increased at a constant rate of increase from 20° C. at the start of slicing to 35° C. at the end of slicing, and the same Warp evaluation as Example 1 was made.

As a result, an average for all wafers was 7.93 μm. Although it was worse than Example 1, the Warp was improved more than the Warp of the wafer sliced by using a conventional wire saw. Since the difference between the supply temperature of the slurry at the start of slicing the workpiece and the temperature of the workpiece at the start of slicing the workpiece was 3° C., degradation of the Warp due to the change in the temperature of the workpiece at the start of slicing the workpiece was not sufficiently suppressed in comparison with Example 1 and thereby resulting in a smaller improvement than Example 1.

Example 7

The workpiece was sliced in the same conditions as Example 1 except of controlling in such a manner that the supply temperature of the slurry was increased at a constant rate of increase from 26° C. at the start of slicing to 35° C. at the end of slicing, and the same Warp evaluation as Example 1 was made.

As a result, an average for all wafers was 7.71 μm. Although it was worse than Example 1, the Warp was improved more than the Warp of the wafer sliced by using a conventional wire saw. Since the difference between the supply temperature of the slurry at the start of slicing the workpiece and the temperature of the workpiece at the start of slicing the workpiece was 3° C., degradation of the Warp due to the change in the temperature of the workpiece at the start of slicing the workpiece was not sufficiently suppressed in comparison with Example 1 and thereby resulting in a smaller improvement than Example 1.

Example 8

The workpiece was sliced in the same conditions as Example 1 except of controlling in such a manner that the supply temperature of the slurry was increased at a constant rate of increase from 23° C. at the start of slicing to 27° C. at the end of slicing, and the same Warp evaluation as Example 1 was made.

As a result, an average for all wafers was 8.71 μm. Although it was worse than Example 1, the Warp was improved more than the Warp of the wafer sliced by using a conventional wire saw. Since the amount of the increase in the supply temperature of the slurry was 4° C., which is less than 5° C., an effect to suppress the decrease in the temperature of the workpiece in the vicinity of the slicing end portion was not sufficient in comparison with Example 1 and thereby resulting in a smaller improvement than Example 1.

Example 9

The workpiece was sliced in the same conditions as Example 1 except of controlling in such a manner that the supply temperature of the slurry was increased at a constant rate of increase from 19° C. at the start of slicing to 34° C. at the end of slicing, and the same Warp evaluation as Example 1 was made.

As a result, an average for all wafers was 8.67 μm. Although it was worse than Example 1 and 6, the Warp was improved more than the Warp of the wafer sliced by using a conventional wire saw. Since the difference between the supply temperature of the slurry at the start of slicing the workpiece and the temperature of the workpiece at the start of slicing the workpiece was 4° C., which exceeded 3° C., degradation of the Warp due to the change in the temperature of the workpiece at the start of slicing the workpiece was not sufficiently suppressed in comparison with Example 1 and 6, and thereby resulting in a smaller improvement than Example 1 and 6.

Example 10

The workpiece was sliced in the same conditions as Example 1 except of controlling in such a manner that the supply temperature of the slurry was increased at a constant rate of increase from 27° C. at the start of slicing to 36° C. at the end of slicing, and the same Warp evaluation as Example 1 was made.

As a result, an average for all wafers was 8.82 μm. Although it was worse than Example 1 and 7, the Warp was improved more than the Warp of the wafer sliced by using a conventional wire saw. Since the difference between the supply temperature of the slurry at the start of slicing the workpiece and the temperature of the workpiece at the start of slicing the workpiece was 4° C., which exceeded 3° C., degradation of the Warp due to the change in the temperature of the workpiece at the start of slicing the workpiece was not sufficiently suppressed in comparison with Example 1 and 7, and thereby resulting in a smaller improvement than Example 1 and 7.

Comparative Example

The workpiece was sliced in the same conditions as Example 1 except of controlling in such a manner that the supply temperature of the slurry was a constant temperature of 23° C. from the start of slicing to the end of slicing, and the same Warp evaluation as Example 1 was made.

Figure 4:
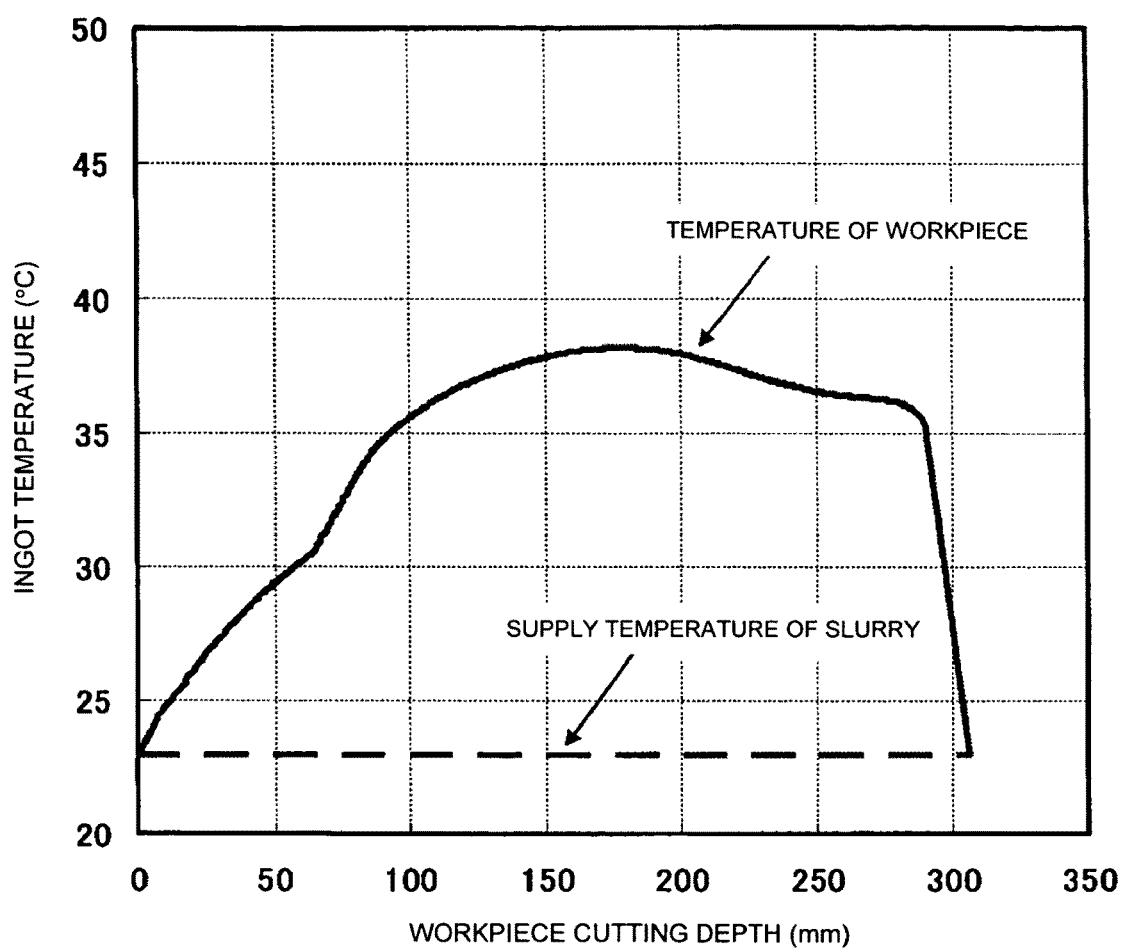
FIG. 4 is a graph showing the temperature of the workpiece and the supply temperature of the slurry during slicing the workpiece when the workpiece is sliced by using a conventional wire saw.

A result of measuring the change in the temperature of the workpiece during slicing is shown in FIG. 4.

As shown in FIG. 4, during slicing, the temperature of the workpiece rose from the start of slicing, reached a maximum temperature of 38.2° C. when the cutting depth was approximately 170 mm, then dropped, and decreased by 15.2° C. to 23° C., which was the same as the supply temperature of the slurry up to the end of slicing.

As shown in FIG. 5(A), the front position of the grooved roller was displaced by approximately 10 forward between the start of slicing and the cutting depth of 150 mm of the workpiece and then the amount of the displacement was constant until the end of slicing. On the other hand, the rear position of the grooved roller most was not displaced during slicing.

Figure 9:
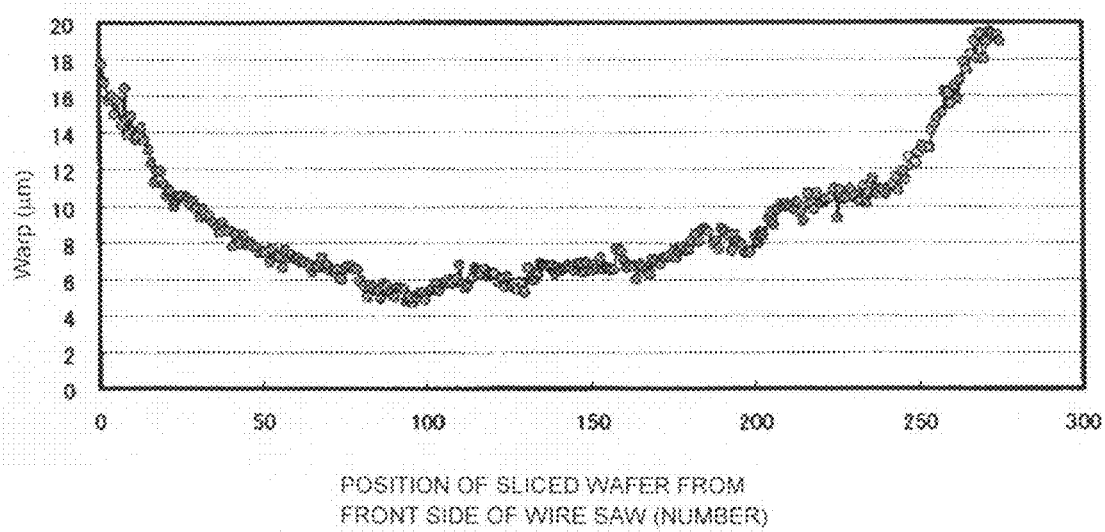
FIG. 9 is a graph showing distribution of the Warp of the wafer when the workpiece is sliced by using a conventional wire saw.

FIG. 9 shows distribution of the Warp of the wafer that was measured after slicing. An average for all wafers was 9.05 μm.

Table 1 shows the combined results of the Warp at the time of slicing the workpiece and the conditions in each of Examples and Comparative Example.

TABLE 1

|  | TEMPERATURE OF WORKPIECE AT START OF SLICING | SUPPLY TEMPERATURE OF SLURRY (AT START OF SLICING → AT END OF SLICING) OR (AT START OF SLICING → MIDDLE → AT END OF SLICING) | Warp (AVERAGE FOR ALL WORKPIECES) |
|---|---|---|---|
| EXAMPLE 1 | 23° C. | 23° C. → 35° C. | 5.51 μm |
| EXAMPLE 2 | 23° C. | 23° C. → 28° C. → 35° C. | 6.95 μm |
| EXAMPLE 3 | 23° C. | 23° C. → 30° C. → 35° C. | 7.33 μm |
| EXAMPLE 4 | 23° C. | 23° C. → 28° C. | 7.53 μm |
| EXAMPLE 5 | 23° C. | 23° C. → 40° C. | 8.22 μm |
| EXAMPLE 6 | 23° C. | 20° C. → 35° C. | 7.93 μm |
| EXAMPLE 7 | 23° C. | 26° C. → 35° C. | 7.71 μm |
| EXAMPLE 8 | 23° C. | 23° C. → 27° C. | 8.71 μm |
| EXAMPLE 9 | 23° C. | 19° C. → 34° C. | 8.67 μm |
| EXAMPLE 10 | 23° C. | 27° C. → 36° C. | 8.82 μm |
| COMPARATIVE EXAMPLE | 23° C. | 23° C. → 23° C. | 9.05 μm |

As explained above, use of the wire saw according to the present invention, which controls in such a manner that the workpiece is sliced while the supply temperature of the slurry is increased from the start to the end of slicing the workpiece, enables suppressing the decrease in the temperature of the workpiece in the vicinity of the slicing end portion of the workpiece and reducing the amount of the change in the rate of increase in the displacement of the grooved roller during slicing. Whereby, the slicing trajectory depicted in the workpiece can be made close to a straight line and the forming of the Warp of the workpiece to be sliced can be suppressed.

It is to be noted that the present invention is not restricted to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A method for slicing a workpiece by using a wire saw including winding a wire around a plurality of grooved rollers, slicing the workpiece into wafers by causing the wire to travel and pressing the workpiece against the wire while supplying a slurry to the grooved rollers, wherein
the workpiece is sliced while a supply temperature of the slurry is increased from the start to the end of slicing the workpiece.

2. The method for slicing a workpiece by using a wire saw according to claim 1, wherein the increase in the supply temperature of the slurry from the start to the end of slicing the workpiece is not less than 5° C. and not more than 15° C.

3. The method for slicing a workpiece by using a wire saw according to claim 1, wherein a difference between the supply temperature of the slurry at the start of slicing the workpiece and a temperature of the workpiece at the start of slicing the workpiece is 3° C. or less.

4. The method for slicing a workpiece by using a wire saw according to claim 2, wherein a difference between the supply temperature of the slurry at the start of slicing the workpiece and a temperature of the workpiece at the start of slicing the workpiece is 3° C. or less.

5. The method for slicing a workpiece by using a wire saw according to claim 1, wherein a rate of increase in the supply temperature of the slurry from the start to the end of slicing the workpiece is constant.

6. The method for slicing a workpiece by using a wire saw according to claim 2, wherein a rate of increase in the supply temperature of the slurry from the start to the end of slicing the workpiece is constant.

7. The method for slicing a workpiece by using a wire saw according to claim 3, wherein a rate of increase in the supply temperature of the slurry from the start to the end of slicing the workpiece is constant.

8. The method for slicing a workpiece by using a wire saw according to claim 4, wherein a rate of increase in the supply temperature of the slurry from the start to the end of slicing the workpiece is constant.

* * * * *